US010062917B2

(12) United States Patent
Furukawa et al.

(10) Patent No.: US 10,062,917 B2
(45) Date of Patent: Aug. 28, 2018

(54) SUPPORT CARBON MATERIAL AND CATALYST FOR SOLID POLYMER TYPE FUEL CELL USE

(71) Applicants: NIPPON STEEL & SUMITOMO METAL CORPORATION, Tokyo (JP); NIPPON STEEL & SUMIKIN CHEMICAL CO., LTD., Tokyo (JP)

(72) Inventors: Shinya Furukawa, Tokyo (JP); Takashi Iijima, Tokyo (JP); Masataka Hiyoshi, Tokyo (JP); Katsumasa Matsumoto, Tokyo (JP); Noriyuki Negi, Tokyo (JP); Hiroyuki Hayashida, Kitakyushu (JP)

(73) Assignees: NIPPON STEEL & SUMITOMO METAL CORPORATION, Tokyo (JP); NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/561,440

(22) PCT Filed: Mar. 3, 2016

(86) PCT No.: PCT/JP2016/056657
§ 371 (c)(1),
(2) Date: Sep. 25, 2017

(87) PCT Pub. No.: WO2016/152447
PCT Pub. Date: Sep. 29, 2016

(65) Prior Publication Data
US 2018/0123154 A1 May 3, 2018

(30) Foreign Application Priority Data
Mar. 26, 2015 (JP) ................... 2015-064971

(51) Int. Cl.
*H01M 8/10* (2016.01)
*B01J 23/42* (2006.01)
(Continued)

(52) U.S. Cl.
CPC ............... *H01M 8/10* (2013.01); *B01J 23/42* (2013.01); *B01J 32/00* (2013.01); *B01J 35/10* (2013.01);
(Continued)

(58) Field of Classification Search
CPC ............................. H01M 8/10; C01B 32/336
(Continued)

(56) References Cited

U.S. PATENT DOCUMENTS

2013/0335883 A1 12/2013 Soneda et al.
2015/0352522 A1 12/2015 Mizuuchi et al.

FOREIGN PATENT DOCUMENTS

JP 2003-201417 A 7/2003
JP 2010-123572 A 6/2010
(Continued)

OTHER PUBLICATIONS

International Search Report for PCT/JP2016/056657 dated May 31, 2016.
(Continued)

*Primary Examiner* — Jonathan G Leong
*Assistant Examiner* — James M Erwin
(74) *Attorney, Agent, or Firm* — Birch, Stewart, Kolasch & Birch, LLP (57) ABSTRACT

A support carbon material able to support a catalyst metal in a highly dispersed state and resistant to the flooding phenomenon and with little voltage drop even at the time of large current power generation under high humidity conditions and a catalyst using the same, specifically, a support carbon material for solid polymer type fuel cell use com-
(Continued)

prised of a porous carbon material which has a pore volume and a pore area found by the BJH analysis method from a nitrogen adsorption isotherm in an adsorption process of a radius 2 nm to 50 nm pore volume $V_A$ of 1 ml/g to 5 ml/g and a radius 2 nm to 50 nm pore area $S_{2-50}$ of 300 m²/g to 1500 m²/g and a ratio ($V_{5-25}/V_A$) of radius 5 nm to 25 nm pore volume $V_{5-25}$ (ml/g) to said pore volume $V_A$ (ml/g) of 0.4 to 0.7 and a ratio ($V_{2-5}/V_A$) of radius 2 nm to 5 nm pore volume $V_{2-5}$ (ml/g) to the same of 0.2 to 0.5 and a catalyst using the same.

6 Claims, 1 Drawing Sheet (51) Int. Cl.
*B01J 32/00* (2006.01)
*B01J 35/10* (2006.01)
*H01M 4/86* (2006.01)
*H01M 4/90* (2006.01)
*H01M 4/92* (2006.01)
*C01B 32/336* (2017.01)
*C01B 32/342* (2017.01)

(52) U.S. Cl.
CPC .......... *C01B 32/336* (2017.08); *C01B 32/342* (2017.08); *H01M 4/86* (2013.01); *H01M 4/90* (2013.01); *H01M 4/92* (2013.01)

(58) Field of Classification Search
USPC ........................................................ 429/492
See application file for complete search history.

(56) References Cited

FOREIGN PATENT DOCUMENTS

| | | |
|---|---|---|
| JP | 2014/1093 A | 1/2014 |
| WO | WO 2014/129597 A1 | 8/2014 |

OTHER PUBLICATIONS

Written Opinion of the International Searching Authority for PCT/JP2016/056657 (PCT/ISA/237) dated May 31, 2016.

SUPPORT CARBON MATERIAL AND CATALYST FOR SOLID POLYMER TYPE FUEL CELL USE

TECHNICAL FIELD

The present invention relates to a support carbon material and catalyst for solid polymer type fuel cell use, more particularly relates to a support carbon material for solid polymer type fuel cell use with little drop in output voltage at the time of power generation by a large current and to a catalyst prepared using this support carbon material.

BACKGROUND ART

A solid polymer type fuel cell has as a basic structure (unit cell) a proton conductive electrolyte film, catalyst layers forming an anode and cathode arranged sandwiching it between them, gas diffusion layers arranged at the further outsides of the same, and separators arranged at the further outsides of the same. Normally, it is comprised of a plurality of such unit cells connected (stacked) in accordance with the required output.

The principle of power generation of such a solid polymer type fuel cell is as follows: At the gas flow paths of the separators arranged at the two sides of the anode and cathode, the anode side catalyst layer is supplied with hydrogen or another reducible gas while the cathode side catalyst layer is supplied with oxygen or air or another oxidizable gas through the respective gas diffusion layers. When using for example hydrogen gas and oxygen gas as these starting material gases, the following reaction 1 occurs on the catalyst metal of the anode side catalyst layer (oxidation reaction) and the following reaction 2 occurs on the catalyst metal of the cathode side catalyst layer (reduction reaction). The energy difference between these reaction 1 and reaction 2 (potential difference) is utilized to generate power while forming water molecules.

$$H_2 \rightarrow 2H^+ + 2e^- (E_0 = 0V) \quad \text{(reaction 1)}$$

$$O_2 + 4H^+ + 4e^- \rightarrow 2H_2O \ (E_0 = 1.23V) \quad \text{(reaction 2)}$$

Further, how much voltage is maintained when taking out current to the outside is one indicator of the characteristics of a solid polymer type fuel cell. Normally, if a higher current is taken out, the voltage tends to drop more.

Further, in the catalyst forming the anode and cathode catalyst layers of a solid polymer type fuel cell, usually platinum (Pt) or a platinum alloy having platinum as its main component (Pt alloy) is used as the catalyst metal. Further, to support particulates of such a catalyst metal and, further, enable the generated power to be taken out to an outside circuit, a conductive carbon material is used as the catalyst support.

In this regard, in recent years, soaring prices of precious metals have led to various studies in the field of solid polymer type fuel cells as well on how to make catalyst metals last longer and be more efficient in reaction. For that, however, it is necessary to raise the surface area per unit weight of the catalyst metal contributing to the reaction. Further, for that reason, it is necessary to make the catalyst metal into particulates and have them supported at the support carbon material in a highly dispersed state. However, if this catalyst metal is made too small as particulates, the contact area with the support carbon material will become smaller and, during fuel cell operating conditions, the particulates will fall off from the support carbon surface or will dissolve, precipitate, aggregate, etc. causing problems in durability. As a result, the surface area will become smaller and will no longer be able to contribute to efficient reaction. That is, there is a suitable size for obtaining both durability of the catalyst metal and high efficiency reaction. For example, with platinum metal, a radius 1.5 nm to 5 nm is considered preferable. In actuality, a radius of 3 nm or so is considered ideal. Further, in order for the catalyst metal to remain present in the state of particulates with such optimum size, the particles of the catalyst metal have to be supported at the support carbon material in a highly dispersed state with a certain distance maintained between them. Further, in a catalyst comprised of a support carbon material at which a catalyst metal is supported, to create such an ideal state, it is necessary that the support carbon material have a sufficient specific surface area.

Further, the catalyst layers forming the anode and cathode contain not only the catalyst metal particulates and support carbon material but also, usually, a proton conductive resin for conduction of hydrogen ions (ionomer, below, referred to as "ionomer"). To impart a solid polymer type fuel cell with high cell characteristics, the above reactions 1 and 2 have to be made to proceed as efficiently as possible. For that reason, it is important to raise the proton conductivity in both the anode and cathode catalyst layers and in the proton conductive electrolyte film. That is, the hydrogen ions generated at the anode side catalyst layer move through the water or ionomer of this catalyst layer from the top of the catalyst metal to the inside of the anode side catalyst layer, through the proton conductive electrolyte film, and, further to the inside of the cathode side catalyst layer of the opposing electrode to the top of the catalyst metal of the cathode side catalyst layer. Raising this proton conductivity is important.

In this regard, in general, if the proton conductive electrolyte film and ionomer become dry in state, the proton conductivity will remarkably fall at that dry part. In the operating conditions of a solid polymer type fuel cell, if the inside of the cell is a low humidity state, the proton conductive electrolyte film and ionomer become poor in wet state and a high proton conductivity can no longer be secure. As a result, the conductivity of the hydrogen ions required for above-mentioned electrochemical reaction will become poorer and the power generation efficiency will fall. For example, at the time of small current discharge, the amount of water generated in a cell is small, so the inside of the cell easily becomes a low humidity state and the output voltage sometimes becomes low. For that reason, a solid polymer type fuel cell includes a humidifier set in the system and is operated while maintained in a suitable wet state by operation of this humidifier.

Furthermore, in a solid polymer type fuel cell, to realize high cell characteristics, at the same time as proton conductivity, it is necessary that the starting material gases (reducible gas and oxidizable gas) diffuse in the catalyst layers and continue to be transported to the catalyst metal in fixed amounts. The gas diffusibility of the starting material gases in the catalyst layers is one of the important issues in improving performance (raising output voltage) in high output (large current) operation for practical application of solid polymer type fuel cells. That is, at the time of large current discharge, the above reaction 2 vigorously occurs inside the cathode side catalyst layer, water vapor is generated, and a high humidity state is created, but at this time, the generated water vapor condenses and the condensed water closes the pores in the catalyst layer providing the route for transporting the starting material gases to the catalyst metal.

The catalyst metal supported in the closed pores can no longer be supplied with oxygen gas and therefore can no longer contribute to the electrochemical reaction. As a result, the power generation efficiency falls, that is, the so-called flooding phenomenon occurs. To improve the performance under such large current operating conditions, in practical application, suppression of the flooding phenomenon under a high humidity environment is becoming an important issue.

Note that, in the following explanation, "large current" indicates the case where the current value per apparent area of an electrode is 1.5 A/cm² or so or more. While depending on the flow rate and concentration of the oxygen gas flowing through the cathode, 1.5 A/cm² is also one metric of the limit current density under common sense operating conditions. Further, regarding the sizes of the pores in the support carbon material of the catalyst forming the catalyst layers, the terms "micropores", "mesopores", and "macropores" are used. In accordance with the IUPAC, pore radius 1 nm or less pores are referred to as "micropores", pore radius 1 to 25 nm pores are referred to as "mesopores", and, further, pore radius 25 nm or more pores are referred to as "macropores".

Therefore, in the past, several attempts have been made to improve the gas diffusibility of the starting material gases in the above-mentioned catalyst layers. Several proposals have also been made for tackling the support carbon materials. For example, PLT 1 proposes, as a support carbon material better in gas diffusibility compared with conventional carbon black, carbon black having a primary particle size of a radius of 10 to 17 nm, having secondary particles of primary particles connected together having spaces between them, and having a total volume of radius 10 to 30 nm pores of 0.40 cm³/g to 2.0 cm³/g. Furthermore, large surface area carbon black is increased in pores inside the support disadvantageous to gas diffusibility, so is not suitable for a support carbon material. The BET specific surface area is considered to be preferably 250 to 400 m²/g. However, such a support carbon material has a specific surface area of 400 m²/g or so. This is too small for achieving the practical support rate of catalyst metal of 40 to 70 mass %. For this reason, the particulates of the catalyst metal easily aggregate and as a result the particle size of the supported catalyst metal becomes coarser and it is difficult to prevent a drop in the power generation performance.

Further, PLT 2 proposes a porous carbon material with a total pore volume of 1 ml/g or more and a pore volume of mesopores (=total pore volume-micropore volume (calculated by HK method)) of 50% or more with respect to the total pore volume as an electrode material for electric double-layer capacitor use. Here, if envisioning application of the above porous carbon material excellent in diffusibility of electrolyte ions in an electric double-layer capacitor to a fuel cell, since mesopores are excellent in gas diffusibility, particulates of catalyst metal supported in the mesopores exhibit sufficient catalytic action and therefore improvement of the large current characteristics can be expected. However, on the other hand, micropores also account for tens of percent of the volume. The micropores are easily closed due to the flooding phenomenon, so the particulates of the catalyst metal in these micropores, accounting for a considerable amount of catalyst metal, can no longer contribute to the catalyst reaction at the time of large current and, as a result, a fall in output occurs.

Furthermore, the carbon material for catalyst support use proposed in PLT 3 is a material comprised of so-called dendritic shaped particles comprised of rod-shaped or ring-shaped unit structures connected three-dimensionally. The dendritic parts have lengths of 50 to 300 nm, while the diameters of the dendritic parts are 30 to 150 nm. The spaces formed by these dendritic particles in the catalyst layer contribute to the diffusibility of the reaction gases and reaction product (water). Further, by making the BET specific surface area 200 to 1300 m²/g, it is possible to make the catalyst metal disperse in a highly dispersed state and it is considered a high power generation performance is obtained. However, the carbon material for catalyst support use in PLT 3 has a 0.2 to 1.5 cc/g pore volume in the radius 0.1 to 10 nm region. Micropores, which are easily closed by the water of the reaction product, are present in a certain ratio, so it is difficult to completely prevent the occurrence of the flooding phenomenon.

Furthermore, PLT 4 proposes using, for at least the carbon material in the cathode side catalyst layer, a catalyst support carbon material A giving a relatively stable power generation performance even in the dry state and supporting a catalyst component, a catalyst support carbon material B relatively excellent in gas diffusibility and supporting a catalyst component, a conduction aid carbon material not supporting a catalyst component, and a gas diffusion carbon material low in water vapor adsorption characteristics, hydrophobic, and not supporting a catalyst component, forming a catalyst layer structure making the inside layer at the side contacting the proton conductive electrolyte film a two-phase mixed structure of a catalyst aggregate phase where the catalyst support carbon material A, conduction aid carbon material, and electrolyte material (ionomer) aggregate and a gas diffusion carbon material aggregate phase where the gas diffusion carbon material aggregates and making the outside layer at the side not contacting the proton conductive electrolyte film a two-phase mixed structure of a catalyst aggregate phase where the catalyst support carbon material B, conduction aid carbon material, and electrolyte material (ionomer) aggregate and a gas diffusion carbon material aggregate phase where the gas diffusion carbon material aggregates, and thereby obtaining a fuel cell which, due to the presence of the gas diffusion carbon material condensed phase, is not only excellent in gas diffusibility, but is also resistant to the occurrence of the flooding phenomenon without regard as to the humidity conditions or load conditions and can exhibit high cell performance. In the fuel cell of this PLT 1, excellent gas diffusibility is achieved. In addition, the occurrence of the flooding phenomenon is considerably suppressed. However, the above catalyst support carbon material A has micropores. It is difficult to quickly remove water generated in micropores supporting catalyst metal. The micropores are closed by the water. Further, the catalyst metal in the micropores does not contribute to the reaction. As a result, the reaction efficiency falls by an amount corresponding to the catalyst metal in the micropores, that is, it is difficult to prevent a drop in voltage.

CITATION LIST

Patent Literature

PLT 1: Japanese Patent Publication No. 2003-201417A
PLT 2: Japanese Patent Publication No. 2014-001093A
PLT 3: WO2014/129597A1
PLT 4: Japanese Patent Publication No. 2010-123572A

SUMMARY OF INVENTION

Technical Problem

As explained above, in the prior art, the pores of the support carbon material were designed focusing on the diffusion of the reaction gas of the oxygen gas (PLTs 1 to 3). Further, the catalyst layers were designed focusing on the suppression of the flooding phenomenon (PLT 4). In both cases, however, the flooding phenomenon occurring in the support carbon material could not necessarily be sufficiently suppressed. Issues remained such as that at the time of large current power generation under high humidity conditions, the rate of utilization of the catalyst metal supported at the support carbon material fell and sufficient power generation performance could not be achieved.

Therefore, the inventors studied in detail the mechanism due to which the flooding phenomenon occurs at the time of large current power generation under high humidity conditions in the operating conditions of a solid polymer type fuel cell and came to believe as follows. First, the flooding phenomenon occurs at the cathode side catalyst layer where water is generated in the power generation reaction and is the following such phenomenon. At this cathode side catalyst layer, the water molecules generated due to the reaction 2 of the catalyst reactions disassociate from the surface of the catalyst metal in the gaseous state, diffuse in the catalyst layer driven by the gradient in concentration, pass through the flow paths of oxygen gas (in practice, air) of the separator arranged at the cathode, and are discharged out of the system, but at this time, the water molecules liquefy in the catalyst layer. The condensed water produced due to this closes the gas diffusion paths of oxygen gas.

Here, the paths of diffusion of water molecules in the catalyst layer are roughly divided into intraparticle pores present inside the particles of the support carbon material and interparticle pores formed between particles of the support carbon material outside the support carbon material. The former are fine pores of several nm or less which a support carbon material comprised of a porous carbon material has inside the material. Particulates of the catalyst metal (platinum particulates) are supported inside the intraparticle pores and perform an important function when the reaction 2 of the catalyst reactions is performed in a catalyst layer. On the other hand, the latter interparticle pores are mainly formed due to the size of the support carbon material and its dendritic structures. In general, the size of the interparticle pores in the catalyst layer becomes the same extent as the typical size scale of the support carbon material. A current representative support carbon material is Ketjenblack (made by Lion). The primary particles forming the dendritic structures are about 40 nm. The average size of the dendritic structures is about 100 nm, so the interparticle pores formed in the catalyst layer are several tens of nm to 100 nm or so.

Further, to suppress the flooding phenomenon, the inventors considered it important to control the former pores present inside the support carbon material. Specifically, the pore size, pore length, hydrophilicity of the pore walls, etc. are controlled. When the pore size becomes a size of an extent of several water molecules, the Van de Waals force (attraction) between the wall surfaces and water molecules causes the pressure causing condensation (liquefaction) (density of water molecules) to fall. As a result, if the current density rises, first, the pores of this size start to be closed. Further, if the hydrophilicity of the wall surfaces forming the pores is high, the water molecules are adsorbed at the wall surfaces and the substantive pore sizes decrease. Further, since the water molecules form the wall surfaces, the pressure for condensation falls, that is, it becomes easier for water to be condensed by a large current. Further, in the catalyst layer, near the ionomer resin or hydrophilic support carbon material, an environment conducive to condensation of the water molecules is formed, so the flooding phenomenon occurs more easily.

Therefore, from the entirely new viewpoint of suppressing the flooding phenomenon which occurs inside a support carbon material, which was never studied in the past, the present inventors studied intensively the pore structure inside the support carbon material for the purpose of improving the power generation characteristics at the time of large current power generation, in particular improving the power generation characteristics at the time of large current power generation under high humidity conditions. In that process, they learned the following facts and thereby completed the present invention. That is, they discovered that to make the particulates of the catalyst metal supported inside the particles of the support carbon material sufficiently participate in the reactions under conditions where the flooding phenomenon easily occurs such as at the time of large current power generation under high humidity conditions, it is possible to form intraparticle pores (catalyst support pores) required for supporting the particulates of the catalyst metal inside the particles of this support carbon material and simultaneously form pores of a size of the same extent as the conventional interparticle pores in the catalyst layer required for gas diffusion (gas diffusion pores) and thereby suppress to a maximum extent the flooding phenomenon which occurred in the fine pores inside the support carbon material up to now and enable almost all of the catalyst metal particulates supported inside the support carbon material to participate in the catalyst reaction and thereby completed the present invention.

Therefore, based on the above basic guidelines, an object of the present invention is to provide a support carbon material able to support a catalyst metal in a highly dispersed state, resistant to the flooding phenomenon even at the time of large current power generation under high humidity conditions, and with little drop in voltage at the time of large current power generation and to provide a catalyst using the same.

Solution to Problem

That is, the present invention is configured as follows:
(1) A support carbon material for solid polymer type fuel cell use comprised of a porous carbon material which has a pore volume and a pore area found by the BJH analysis method from a nitrogen adsorption isotherm in an adsorption process satisfying the following conditions:
a radius 2 nm to 50 nm pore volume $V_A$ of 1 ml/g to 5 ml/g and a radius 2 nm to 50 nm pore area $S_{2-50}$ of 300 m$^2$/g to 1500 m$^2$/g and
a ratio ($V_{5-25}/V_A$) of radius 5 nm to 25 nm pore volume $V_{5-25}$ (ml/g) to the pore volume $V_A$ (ml/g) of 0.4 to 0.7 and a ratio ($V_{2-5}/V_A$) of radius 2 nm to 5 nm pore volume $V_{2-5}$ (ml/g) to the same of 0.2 to 0.5.
(2) The support carbon material for solid polymer type fuel cell use according to (1) wherein the pore volume $V_{5-25}$ is 0.7 ml/g to 2 ml/g.
(3) The support carbon material for solid polymer type fuel cell use according to (1) or (2) wherein an average particle radius is 0.1 μm to 5 μm.
(4) A catalyst for solid polymer type fuel cell use comprising a support carbon material for solid polymer type fuel cell use according to any one of (1) to (3) at which catalyst metal particulates comprised of Pt or a Pt alloy having Pt as its main component are supported.

Advantageous Effects of Invention

The support carbon material of the present invention is not only excellent in gas diffusibility of the starting material gases in the catalyst layers in a solid polymer type fuel cell made using the same, but also can suppress the occurrence of the flooding phenomenon to the maximum extent due to the gas diffusion pores and catalyst support pores formed inside the particles of the support carbon material and can make the supported catalyst metal efficiently participate in the catalyst reaction. At the time of large current power generation, in particular at the time of large current power generation under high humidity conditions, it is possible to prevent a drop in voltage and obtain good power generation characteristics.

DESCRIPTION OF EMBODIMENTS

Below, embodiments of the present invention will be concretely explained. The most important thing in the present invention is to create catalyst support pores required for supporting the particulates of the catalyst metal (corresponding to conventional intraparticle pores) and gas diffusion pores required for securing gas diffusibility (corresponding to conventional interparticle pores in catalyst layers) inside the particles of the support carbon material. More specifically, the support carbon material of the present invention has a pore structure designed based on the following basic guidelines:

(1) Radius 1 nm or less so-called "micropores" provide a ready setting for condensation of water vapor at low relative pressures and become the cause of the flooding phenomenon. Further, in the micropores, gas diffusion is also slow. It is believed that they do not substantially contribute to large current power generation characteristics. Therefore, smaller volume and area of micropores are preferable, but micropores inherent to the material due to the production process and starting materials are allowed to a certain extent. The present invention prescribes the volume and area of mesopores so as to lower the relative ratios of the volume and area of micropores.

(2) Radius 2 nm to 50 nm pores provide locations for adsorption required for supporting the catalyst metal particulates and, further, provide the spaces required for diffusion of gas (oxygen and water vapor). Therefore, in the present invention, the lower limit and upper limit of the radius 2 nm to 50 nm pore volume are prescribed.

(3) The area of the radius 2 nm to 50 nm pores provides places for supporting catalyst metal particulates. In the present invention, a lower limit of the value of the area for enabling the practical catalyst metal particulate support rate of 30 mass %, preferably 40 mass % or more, is set. Further, a substantive upper limit is prescribed.

(4) Radius 5 nm to 25 nm pores play the role of greatly increasing the diffusion of gas (oxygen and water vapor) inside the particles of the support carbon material and are the gas diffusion pores of the present invention. The gas diffusion pores correspond to conventional interparticle pores in the catalyst layers and form gas diffusion flow paths guiding water molecules produced inside the particles of the support carbon material to the particle surfaces. The volume of the pore size of the gas diffusion pores is a value which did not exist in conventional carbon materials of several micron sizes such as activated carbon. In general, activated carbon is obtained by treating a powder of coke, coconut shells, phenol resin, etc. by chemical activation using zinc chloride, activation by steam, etc. to form pores. The pores introduced by this method are structured mainly comprised of pores of pore radius 1 nm or less for the purpose of enabling adsorption of substances with relatively small molecular weights. The 5 nm to 25 nm pores which the present invention seeks do not exist much in conventional activated carbon etc. Note that specific numerical values of pore structures of activated carbon are shown in the examples.

(5) Radius 2 nm to 5 nm pores are designed as pores of a size supporting the practical size radius 1 to 3 nm catalyst metal particulates and having spaces enabling gas diffusion. An upper limit and lower limit of the ratio of the radius 2 nm to 5 nm pore volume to the radius 2 nm to 50 nm pore volume are set. In general, Ketjenblack is used as the support carbon material of a solid polymer type fuel cell, but this material is produced by activation of carbon black by steam. The pores formed by this steam activation are formed as radius 1 nm or less micropores from the material surface to the insides at the initial stage of the reaction. As the activation reaction further proceeds, the walls forming the micropores are eaten away and the pore sizes gradually become larger whereby radius 1 nm or more mesopores are formed. The ratio of micropores and mesopores formed differs depending on the degree of activation, but if trying to maintain a surface area of 500 $m^2/g$, there is an upper limit to the pore size of the pores formed by this method. If looking at Ketjenblack EC300, which is currently the material most generally used as a support carbon material, there are substantially zero pores with a primary particle size of 40 nm or so and radius of 5 nm or more. Note that specific numerical values of the pore structures of Ketjenblack EC300 are shown in the examples.

Figure 1:
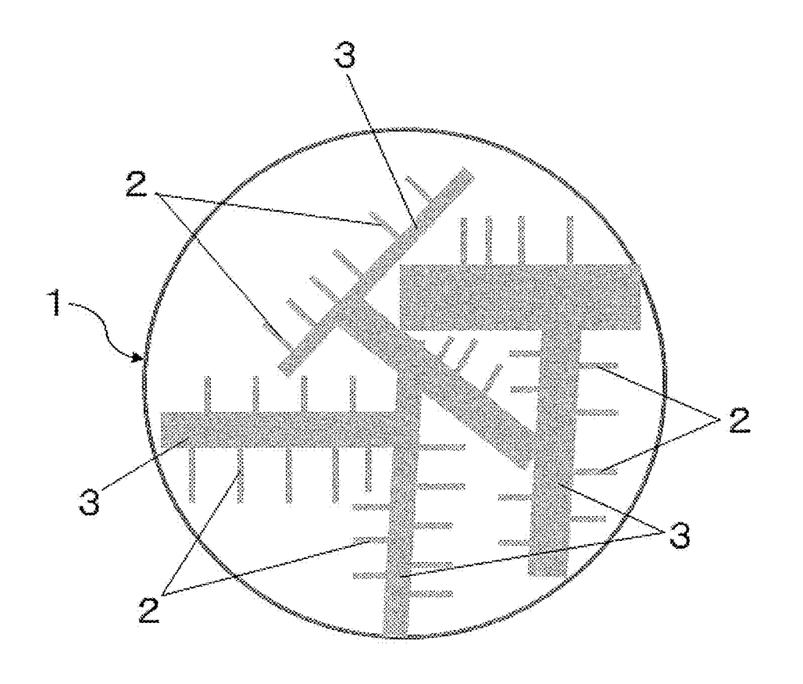
FIG. 1 is an explanatory view schematically showing the pore structure of a support carbon material of the present invention.

The support carbon material of the present invention, if showing this by a schematic view, has a pore structure such as shown in FIG. 1. That is, in FIG. 1, inside a particle 1 of the support carbon material, there are mesopores comprised of radius 2 nm to 5 nm pores (catalyst support pores) 2 and mesopores comprised of radius 5 nm to 25 nm pores (gas diffusion pores) 3. Inside the catalyst support pores 2, not shown radius 1 to 3 nm catalyst metal particulates are supported. The water molecules produced on the catalyst metal particulates inside the catalyst support pores 2 immediately diffuse to the inside of the gas diffusion pores 3 connected with the catalyst support pores 2, further diffuse to the outside of the particles 1, and are discharged through the interparticle pores in the catalyst layer to outside the catalyst layer. Therefore, in a catalyst layer formed using the support carbon material of the present invention, space (gas diffusion paths) enabling water vapor and oxygen gas to be sufficiently diffused is secured. Due to this, it is possible to effectively suppress the flooding phenomenon even at the time of large current power generation under high humidity conditions. Further, the supply of oxygen gas required for large current power generation is secured.

Here, for the pores formed inside the particles of the support carbon material (catalyst support pores and gas diffusion pores), the total volume of radius 2 nm to 50 nm pores is defined as the total pore volume $V_A$. The upper limit of the radius of the total pore volume is prescribed as 50 nm for the following reason. That is, the practical thickness of a catalyst layer is 10 μm or so, therefore particles of the support carbon material are restricted in particle size to several μm or so. In a support carbon material having such particle sizes, to secure a sufficient speed of gas diffusibility and maintain the physical strength of the particles considered required in the cell production process, the pore size is limited to a submicron one of at least 1/10 or less of the particle size. On the other hand, the upper limit value of the pore size reliable in gas adsorption is 50 nm or so. As the upper limit of the practically important pore size, 50 nm was selected.

In the support carbon material of the present invention, the radius 2 nm to 50 nm pore volume $V_A$ formed inside the particles is 1 ml/g to 5 ml/g, more preferably $V_A$ is 1.5 ml/g to 4.5 ml/g. Further, the radius 2 nm to 50 nm pore area $S_{2-50}$ is 300 m$^2$/g to 1500 m$^2$/g. If the above pore volume $V_A$ is 1 ml/g or less, gas diffusion pores excellent in gas diffusibility cannot be formed inside the particles. Conversely, if the pore volume $V_A$ exceeds 5 ml/g, if trying to secure a radius 2 nm to 50 nm pore area $S_{2-50}$ of 300 m$^2$/g or more, the pore walls become too thin, the strength as particles falls, the pores are crushed in the catalyst preparation process for supporting the catalyst metal or ink preparation process, and the support carbon material is liable to become finer. Further, if the pore area $S_{2-50}$ is smaller than 300 m$^2$/g, the area required for supporting the catalyst metal particulates by a practical support rate of 40 mass % or so cannot be secured. As a result, the catalyst metal particulates end up aggregating etc. and the power generation characteristics end up falling. Further, there is inherently no upper limit to this area indicator, but it is substantially up to 1500 m$^2$/g. A support carbon material with a larger pore area $S_{2-50}$ than this cannot be used since the particles become low in mechanical strength.

Further, the support carbon material of the present invention has to have a ratio ($V_{5-25}/V_A$) of the radius 5 nm to 25 nm pore volume $V_{5-25}$ (ml/g) to the pore volume $V_A$ of 0.4 to 0.7, preferably 0.5 to 0.65. If this ratio ($V_{5-25}/V_A$) is smaller than 0.4, gas diffusion pores excellent in gas diffusibility are not formed inside the particles, water molecules easily condense at the time of large current power generation, and the flooding phenomenon easily occurs. As a result, the oxygen gas becomes insufficiently diffused, the voltage drop at the time of large current power generation becomes large, and the power generation characteristics fall. Conversely, if the above ratio ($V_{5-25}/V_A$) is larger than 0.7, as explained above, the pore walls become thinner, the strength as particles falls, the pores are crushed in the catalyst preparation process or ink preparation process, and the support carbon material is liable to become finer.

This radius 5 nm to 25 nm pore volume $V_{5-25}$ is preferably 0.7 ml/g to 2 ml/g. If smaller than 0.7 ml/g, the pore volume itself is too small, gas diffusion pores excellent in gas diffusibility are not formed inside the particles, water molecules easily condense at the time of large current power generation, and the flooding phenomenon easily occurs. Conversely, if larger than 2 ml/g, the strength as particles falls, the material is mechanically pulverized in the catalyst preparation process or ink preparation process, and the particles are liable to be broken and simultaneously the pores are liable to end up being crushed.

Furthermore, the support carbon material of the present invention has to have a ratio ($V_{2-5}/V_A$) of the radius 2 nm to 5 nm pore volume $V_{2-5}$ with respect to the above pore volume $V_A$ of 0.2 to 0.5, preferably 0.25 to 0.4. If this ratio ($V_{2-5}/V_A$) is smaller than 0.2, it is not possible to secure the volume required for securing the practical support rate of catalyst metal particulates. As a result, the catalyst metal particulates aggregate etc. resulting in a drop in the surface area effective for the catalyst reaction and a drop in the power generation characteristics, in particular the power generation characteristics at the time of large current power generation. Conversely, if the ratio ($V_{2-5}/V_A$) is larger than 0.5, the radius 5 nm to 25 nm pore volume $V_{5-25}$ becomes relatively smaller. As a result, it is not possible to supply sufficient oxygen gas to the pore inlets of the radius 2 nm to 5 nm catalyst support pores substantially supporting the catalyst metal or the water molecules produced inside the catalyst support pores can no longer diffuse to outside the particles and the flooding phenomenon is liable to occur at the time of large current power generation. Further, the supply of oxygen gas is restricted in speed so the power generation characteristics at the time of large current power generation are liable to fall.

In the present invention, the average particle radius of the support carbon material is preferably 0.1 μm (100 nm) to 5 μm (5000 nm), more preferably 0.6 μm to 3 μm, as compared with the conventional type of support carbon material where the radius is several tens of nm. If this average particle radius is smaller than 0.1 μm, it becomes substantially difficult to form radius 5 nm to 25 nm gas diffusion pores by a ratio ($V_{5-25}/V_A$) of the pore volume $V_{5-25}$ (ml/g) with respect to the pore volume $V_A$ of 0.4 to 0.7, while conversely, if the average particle radius is larger than 5.0 μm, when forming a practical thickness 10 μm catalyst layer, the surface of this catalyst layer is formed with relief shapes of an order of several μm, the flow of reaction gas becomes uneven, and the power generation characteristics are liable to fall.

As the support carbon material comprised of a porous carbon material of the present invention, a carbon material made porous by so-called activation, activated carbon fiber or other activated carbon, a carbon material formed using magnesium, zeolite, silica, alumina, etc. as a template such as in PLT 2 etc., a carbon material formed by treating a metal carbide by chlorine at a high temperature, porous carbon black such as Ketjenblack, a porous carbon material having dendritic structures such as in PLT 3 etc., and the like may be mentioned. Further, it may be a carbon material obtained by further treating these porous carbon blacks or porous carbon materials by activation treatment to make them more porous.

The support carbon material comprised of the porous carbon material of the present invention can be produced by proactively treating a carbon material by activation treatment to enlarge the size of the pores or form through holes etc. so as to create the optimal pore structures inside the particles of the carbon material. As the method of activation at this time, for example, the gas activation method or chemical activation method etc. may be mentioned. As the gas activation method, there is the method of making a carbonized material react with water vapor, carbon dioxide, air, combustion gas, etc. at 700° C. or more in temperature to make it porous. Further, as the chemical activation method, the method of using an activation agent comprised of one or more agents selected from the group comprised of phosphoric acid, sulfuric acid, calcium chloride, zinc chloride, potassium sulfide, an alkali metal compound, etc. may be mentioned. These activation agents sometimes are used as aqueous solutions of activation agents in accordance with need. Further, as an alkali metal hydroxide used as the activation agent, for example, potassium hydroxide, sodium hydroxide, or other alkali metal hydroxides, potassium carbonate, sodium carbonate, or other alkali metal carbonates, potassium sulfate, sodium sulfate, or other alkali metal sulfonates, etc. may be mentioned.

Further, for the method of producing the catalyst for solid polymer type fuel cell use using the support carbon material of the present invention, for example, it is possible to use the method of immersing the support carbon material in an aqueous solution of a catalyst metal compound such as chloroplatinic acid, adding a hydrogen peroxide aqueous solution at a predetermined temperature under stirring, then adding an $Na_2S_2O_4$ aqueous solution to prepare a catalyst precursor, filtering, rinsing, and drying this catalyst precursor, then treating it in a 100%-$H_2$ stream at a predetermined temperature and time for reduction or other method of production of this type of catalyst known in the past. Furthermore, it is possible to use the thus obtained catalyst for solid polymer type fuel cell use of the present invention by a method similar to the methods known in the past so as to form a catalyst layer for solid polymer type fuel cell use and, further, use the catalyst layer to produce a solid polymer type fuel cell.

Here, the catalyst metal to be supported at the support carbon material is not particularly limited so long as one having the function of promoting the chemical reaction required at the anode side or the cathode side catalyst layer. As specific examples, platinum, palladium, ruthenium, gold, rhodium, osmium, iridium, tungsten, lead, iron, chrome, cobalt, nickel, manganese, vanadium, molybdenum, gallium, aluminum, and other metals or complexes or alloys etc. of two types or more of these metals combined may be mentioned. Further, another catalyst metal or co-catalyst metal etc. may be jointly used. In the present invention, what is particularly preferable as the catalyst metal is platinum (Pt) or a platinum alloy having platinum as its main component (Pt alloy).

EXAMPLES

Below, the support carbon material and catalyst for solid polymer type fuel cell use of the present invention will be explained based on examples and comparative examples. Note that in the following examples and comparative examples, the pore volume and pore area of the pores and the average particle radius were measured as follows:

Measurement of Pore Volume and Pore Area

The pore size of the present invention was found by analysis from an adsorption isotherm of nitrogen gas at the liquid nitrogen temperature. Specifically, a BELSORPmini made by Microtrac Bel was used. The analysis software attached to the device was used to calculate the distribution of mesopores by the BJH method. From the table of numerical values, radius 2 nm to 50 nm pore volume $V_A$, radius 2 nm to 50 nm pore area $S_{2-50}$, radius 5 nm to 25 nm pore volume $V_{5-25}$, and radius 2 nm to 5 nm pore volume $V_{2-5}$ of the present invention were calculated.

Measurement of Average Particle Radius

For measurement of the particle size distribution of the support carbon material, a laser diffraction type particle size distribution measuring apparatus (SALD-3000S) made by Shimadzu Corporation was used. The average particle size obtained by the software for analysis of particle size distribution attached to that apparatus (average value calculated based on frequency with respect to particle size found by logarithmic display) was made the average particle radius of the present invention.

1. Preparation of Support Carbon Material

Method A: Preparation of Support Carbon Material Using Alumina Particles as Template Particle size (diameter) 10 nm, 20 nm, and 50 nm gamma type alumina particles (4N nano alumina (gamma) made by SI Science) were used. Polyvinyl alcohol powder (complete saponification type, average polymerization degree 1000) was mixed with these gamma type alumina particles in weight ratios of 1:2. The mixtures were held in an inert gas atmosphere at 600° C. for 2 hours, then were raised in temperature and held at 900° C. for 1 hour for firing. After that, the obtained alumina-carbon composites were treated in a 10 mass %—sodium hydroxide aqueous solution at 60° C. for 5 hours or more to dissolve and remove the alumina. Further, the results were filtered and redispersed in pure water three times repeatedly to wash it. The solids obtained by filtration were dried at 90° C. for 4 hours to obtain carbon materials.

Each thus obtained carbon material was pulverized using a planetary ball mill (Premium-Line P7 made by Fritsch-Japan) at a speed of 50 to 200 rpm for 10 minutes as treatment conditions to obtain a support carbon material A10 obtained using the particle size (diameter) 10 nm starting material, support carbon material A20 obtained using the 20 nm starting material, and support carbon material A50 obtained using the 50 nm starting material. Further, using a carbon material obtained using a particle size (diameter) 10 nm starting material and changing the pulverization conditions, four types of support carbon materials (A10S, A10SS, A10L, and A10LL) were prepared.

Furthermore, the above gamma type alumina particles with particle sizes (diameters) of 10 nm and 20 nm were blended by ratios of mass mixing ratios of 2:1, 1:1, and 1:2 and fully mixed by a mortar. Using the obtained mixed starting materials, carbon materials were prepared under the same conditions as above. These were pulverized under conditions similar to the above to obtain a support carbon material A21 obtained using mixed starting materials with a mass mixing ratio of 2:1, a support carbon material A11 obtained using mixed starting materials with a mass mixing ratio of 1:1, and a support carbon material A12 obtained using mixed starting materials with a mass mixing ratio of 1:2.

Similarly, the above gamma type alumina particles with particle sizes (diameters) of 10 nm and 50 nm were blended by a ratio of mass mixing ratio of 1:1 and fully mixed by a mortar to obtain a mixed starting material, and the above particle size (diameter) 20 nm and 50 nm gamma type alumina particles were blended by a ratio of a mass mixing ratio of 1:1 and fully mixed to obtain another mixed starting material. Using these obtained mixed starting materials, carbon materials were prepared under the same conditions as above. These were pulverized under conditions similar to the above to obtain a support carbon material AA11 obtained using particle size (diameter) 10 nm and 50 nm gamma type alumina particles and a support carbon material AB11 obtained using particle size (diameter) 20 nm and 50 nm gamma type alumina particles.

Each of the above obtained support carbon materials was treated by the following activation treatment for the purpose of enlarging the pores to obtain an activated support carbon material.

Activation Treatment C 2 to 3 g of each obtained support carbon material was weighed out on an alumina boat. This was set in a horizontal type tubular electric furnace. While circulating nitrogen gas at 100 ml/min, the temperature was raised to 1100° C. After that, carbon dioxide was circulated at a rate of 100 ml/min while treating the material by a treatment time of 1 hour (-C1) or a treatment time of 3 hours (-C3) for activation treatment to prepare activated support carbon materials. Note that each thus obtained activated support carbon material is indicated with "-C1" or "-C3" attached to the end of the symbols of the support carbon material in a manner denoting the activated support carbon material obtained by treating the support carbon material A10 for 1 hour (-C1) as activation treatment as A10-C1 and, further, denoting the activated support carbon material obtained by treating the support carbon material A10 for 3 hours (-C3) as activation treatment as A10-C3.

Activation Treatment K

As the activation treatment, the inventors also studied so-called alkali activation using an alkali as an activation agent. In this alkali activation, about 2 g of each support carbon material obtained above and 5 to 10 g of KOH powder were mixed by a mortar. The obtained mixed powder was packed into a nickel tubular container and treated in an inert gas atmosphere at 450° C. for a treatment time of 1 hour (-K1) or a treatment time of 3 hours (-K3) as activation treatment. After that, ethanol was placed inside the nickel tubular container after cooling in a glovebox to dissolve the alkali metal. The result was filtered, and the obtained solids were washed by pure water, then were dried in at 90° C. for 4 hours in vacuum to prepare each activated support carbon material. Each obtained activated support carbon material, in the same way as the case of the activation treatment C, has "-K1" or "-K3" attached to the end of the symbols of the support carbon material.

Method B: Preparation of Support Carbon Material by Firing Mg Gluconate

Magnesium gluconate n-hydride ($C_{12}H_{22}MgO_{14}.nH_2O$) was filled in a quartz boat which was then set in a horizontal type tubular electric furnace. This was raised in temperature by a rate of temperature rise of 10° C. per minute up to 500° C., was held at this temperature for 2 hours, then was raised in temperature to 900° C. and further was held at this temperature for 1 hour to fire the magnesium gluconate n-hydride. During firing, 200 ml/min of argon gas was circulated in the tubular furnace to remove the volatile components formed during the firing. The magnesium compound was dissolved away from the carbon-magnesium composite obtained by this firing process by dilute sulfuric acid, then the result was washed by pure water, filtered, and dried to obtain the support carbon material B.

The above obtained support carbon material B was treated by the above activation treatment C or activation treatment K to obtain an activated support carbon material. Each activated support carbon material, in the same way as the case of the above method A, has "-C1", "-C3", "-K1", or "-K3" attached to its end to indicate the support carbon material B-C1, support carbon material B-C3, support carbon material B-K1, or support carbon material B-K3.

Method C: Preparation of Support Carbon Material Using Mesoporous Silica as Template Mesoporous aluminate silica (MCM41 made by Aldrich; aluminum 3%) and sucrose ($C_{12}H_{22}O_{11}$) were mixed. To this, concentrated sulfuric acid was added. The mixture was held at 200° C. for 2 hours, then was held at 1200° C. for 1 hour to fire it. The obtained silica-carbon complex was washed by hydrogen fluoride to obtain the support carbon material C.

Next, except for making the circulation rate of the carbon dioxide 30 ml/min, the above support carbon material C was treated in accordance with the activation treatment C to obtain an activated support carbon material. The obtained activated support carbon material, in the same way as the case of the above method A, has "-C1" or "-C3" attached to its end to indicate the support carbon material C-C1 or support carbon material C-C3. Furthermore, similarly, except for heating in an inert gas atmosphere to 500° C., the above support carbon material C was treated in accordance with the above activation treatment K to obtain an activated support carbon material. The obtained activated support carbon material, in the same way as the case of the above method A, has "-K1" or "-K3" attached to its end to indicate the support carbon material C-K1 or support carbon material C-K3.

Method D: Preparation of Support Carbon Material Using Zeolite as Template

A porous carbon material obtained using zeolite as a template was prepared based on the document of Kyoya et al. (Carbon, 2008, No. 235, p. 307 to 316). As the template, powder Na-Y type zeolite (HZS-320NAA made by Toso) was used in accordance with the following procedure to synthesize a porous carbon material having a several A 3D periodic structure regularity. Na-Y type zeolite powder dried in advance at 150° C. was placed in a quartz reaction tube. To this, furfuryl alcohol was added to an extent whereby the zeolite was immersed, then the result was stirred while impregnating it. After that, this was heated to 150° C. to make the furfuryl alcohol impregnated in the pores of the zeolite polymerize. Further, this was heat treated at 900° C. to make the polymer in the pores carbonize to synthesize a carbon-zeolite composite. Next, the obtained carbon-zeolite composite was treated by hydrofluoric acid and hydrochloric acid to dissolve away the zeolite to obtain a support carbon material D comprised of a porous carbon material.

Further, except for making the circulation rate of the carbon dioxide 30 ml/min, the above support carbon material D was treated in accordance with the activation treatment C to obtain an activated support carbon material. The obtained activated support carbon material, in the same way as the case of the above method A, has "-C1" or "-C3" attached to its end to indicate the support carbon material D-C1 or support carbon material D-C3. Furthermore, except for heating in an inert gas atmosphere to 500° C., the above support carbon material D was treated in accordance with the above activation treatment K to obtain an activated support carbon material. The obtained activated support carbon material, in the same way as the case of the above method A, has "-K1" or "-K3" attached to its end to indicate the support carbon material D-K1 or support carbon material D-K3.

Other Carbon Materials: Carbon Black, Activated Carbon, MCND

As an example of carbon black, Ketjenblack (EC300 made by Lion) being used as the standard for catalyst supports in current solid polymer type fuel cells was used. This material was designated the support carbon material E. As an example of activated carbon, "YP80F" made by Kuraray Chemical was used. This was adjusted to an average particle radius 1.2 μm using a pulverizer. This material was designated the support carbon material F. As an example of a carbon material not made porous, acetylene black (AB; Denka Black Powder made by Denka) was used. This material was designated the support carbon material G. Based on the method described in Example 1 of PLT 3, a carbon material (MCND) was produced. This material was designated the support carbon material H.

Each type of carbon material prepared above was measured for radius 2 nm to 50 nm pore volume $V_A$ (ml/g), radius 2 nm to 50 nm pore area $S_{2-50}$ (m²/g), radius 5 nm to 25 nm pore volume $V_{5-25}$ (ml/g), radius 2 nm to 5 nm pore volume $V_{2-5}$ (ml/g), and average particle radius (μm). Further, the ratio ($V_{5-25}/V_A$) and ratio ($V_{2-5}/V_A$) were calculated and the pore structure of each support carbon material was investigated. The results are shown in Table 1 and Table 2.

Preparation of Fuel Cell and Evaluation of Cell Performance

1. Preparation of Catalyst and Catalyst Coating Ink

Each support carbon material shown in Table 1 and Table 2 was made to disperse in a mixed solution containing platinic chloride, water, and ethanol in predetermined ratios. After that, the mixture was degassed to prepare a dispersion comprised of the mixed solution in which the support carbon material was dispersed. Next, into this dispersion, a precipitant (reducing agent) comprised of ammonia water was slowly added dropwise and the mixture stirred for 1 hour. The precipitate obtained using the ammonia water was washed and filtered. The obtained solids were fired in an He gas atmosphere at 350° C. for 3 hours as conditions to obtain a platinum-supporting carbon material supporting 50 mass % of platinum (Pt catalyst).

Next, the Pt catalyst was taken in a container in an Ar gas atmosphere. To this, as an electrolyte material, an electrolyte resin made by Dupont (Nafion®) was added and lightly stirred. After that, ultrasonic waves were used to crush the platinum-supporting carbon material. Further, ethanol was added under stirring to give a total solids concentration of Pt catalyst and persulfonic acid-based ion exchange resin of 1 mass % and prepare a catalyst coating ink comprised of a Pt catalyst and electrolyte resin mixed together.

2. Preparation of Catalyst Layer

After that, to each thus prepared predetermined amount of catalyst coating ink, ethanol was added under stirring to adjust the platinum concentration to 0.5 mass %, then the spray conditions were adjusted so that the mass of the catalyst metal component (platinum) per catalyst layer unit area (below, referred to as "basis weight of the catalyst metal component") became 0.2 mg/cm², the catalyst coating ink was spray coated onto a Teflon® sheet, then the sheet was dried in an argon gas atmosphere at 120° C. for 60 minutes to prepare a catalyst layer.

3. Preparation of MEA

The above prepared catalyst layers were used to prepare MEAs (membrane electrode assemblies) by the following method. A square piece of electrolytic film of 6 cm per side was cut out from a Nafion film (made by Dupont, NR211). Further, the catalyst layers of the anode and cathode coated on Teflon® sheets were respectively cut out by a cutter knife to square pieces of 2.5 cm per side. Between the thus cut out catalyst layers of the anode and cathode, this electrolytic film was sandwiched so that the catalyst layers sandwiched and contacted the center part of the electrolytic film and were not offset from each other, the assembly was pressed at 120° C. by 100 kg/cm² for 10 minutes, then cooled down to room temperature, then only the Teflon® sheets were carefully peeled off at both the anode and cathode to prepare a catalyst layer-electrolytic film assembly with the catalyst layers of the anode and cathode fixed to the electrolytic film.

Next, as the gas diffusion layers, a pair of square shaped pieces of carbon paper (made by SGL Carbon, 35BC) were cut out from the carbon paper in sizes of 2.5 cm per side. Between these pieces of carbon paper, the above catalyst layer-electrolytic film assembly was sandwiched so that the anode and cathode catalyst layers were aligned with no offset. This was pressed at 120° C. by 50 kg/cm² for 10 minutes to prepare an MEA.

Note that, the basis weights of the different components of the catalyst metal component (platinum), carbon material, and electrolytic material in each MEA prepared were calculated by finding the mass of the catalyst layers fixed to the Nafion film (electrolytic film) from the difference of the mass of the Teflon® sheets with the catalyst layers before pressing and the mass of the Teflon® sheets peeled off after pressing and using the mass ratios of the compositions of the catalyst layers. Further, it was made possible to use the carbon material A-60-1400 in common for the anodes and evaluate only the performance of the cathode catalyst layer from the results of evaluation of the power generation characteristics.

4. Test for Evaluation of Fuel Cell

Each prepared MEA was assembled into a cell and evaluated for performance of the fuel cell by the following procedure using a fuel cell measuring device. As the supplied gas, air was supplied to the cathode and, further, pure hydrogen was supplied to the anode to give rates of utilization of respectively 40% and 70%. At this time, the respective gas pressures were adjusted and set to 0.1 MPa by a back pressure valve provided downstream of the cell.

For evaluation of the performance as a fuel cell, the output characteristics at the time of large current power generation were evaluated using a high humidity gas at which the flooding phenomenon easily occurs. Specifically, the cell temperature was set to 80° C. and, further, the supplied air and pure hydrogen were moistened by bubbling in distilled water warmed to respectively 85° C. and 80° C. Due to this condition, air and hydrogen are supplied to the cell in the state saturated with water vapor. Under the above condition, the fuel cell was evaluated by measuring the cell voltage at 1200 mA/cm² of the region where the effect of the support carbon material used remarkably appears, that is, the resistance to gas diffusion becomes larger. In Table 1 and Table 2, the cell voltage of the support carbon material evaluated by the above method is shown as the "output voltage (V) at the time of high humidity.

TABLE 1

| Support carbon material | $V_A$ (mL/g) | $V_{2-5}/V_A$ | $V_{5-25}/V_A$ | $V_{5-25}$ (mL/g) | $S_{2-50}$ (m2/g) | Aver. par. radius (μm) | Output voltage (V) | |
|---|---|---|---|---|---|---|---|---|
| A10 | 0.96 | 0.58 | 0.24 | 0.23 | 390 | 2.4 | 0.42 | C. Ex. 1 |
| A20 | 0.87 | 0.13 | 0.82 | 0.71 | 220 | 2.5 | 0.36 | C. Ex. 2 |
| A50 | 0.57 | 0.06 | 0.59 | 0.34 | 215 | 4.5 | —*1) | C. Ex. 3 |
| A10-C1 | 2.30 | 0.42 | 0.43 | 0.99 | 825 | 2.3 | 0.65 | Ex. 1 |
| A20-C1 | 2.20 | 0.21 | 0.68 | 1.50 | 490 | 2.4 | 0.64 | Ex. 2 |
| A50-C1 | 1.10 | 0.13 | 0.51 | 0.56 | 320 | 4.0 | 0.40 | C. Ex. 4 |
| A10-C3 | 3.00 | 0.34 | 0.59 | 1.77 | 1020 | 1.9 | 0.72 | Ex. 3 |
| A20-C3 | 2.50 | 0.28 | 0.57 | 1.43 | 615 | 2.1 | 0.66 | Ex. 4 |
| A50-C3 | 1.54 | 0.21 | 0.45 | 0.69 | 480 | 3.6 | 0.61 | Ex. 5 |

TABLE 1-continued

| Support carbon material | $V_A$ (mL/g) | $V_{2-5}/V_A$ | $V_{5-25}/V_A$ | $V_{5-25}$ (mL/g) | $S_{2-50}$ (m2/g) | Aver. par. radius (μm) | Output voltage (V) | |
|---|---|---|---|---|---|---|---|---|
| A21 | 1.14 | 0.51 | 0.33 | 0.38 | 290 | 2.5 | —*[1] | C. Ex. 5 |
| A11 | 1.03 | 0.45 | 0.61 | 0.63 | 260 | 2.4 | 0.37 | C. Ex. 6 |
| A12 | 0.95 | 0.33 | 0.77 | 0.73 | 245 | 2.4 | 0.40 | C. Ex. 7 |
| A21-C1 | 2.19 | 0.44 | 0.43 | 0.94 | 465 | 2.3 | 0.65 | Ex. 6 |
| A11-C1 | 2.27 | 0.38 | 0.49 | 1.11 | 425 | 2.2 | 0.66 | Ex. 7 |
| A12-C1 | 2.10 | 0.33 | 0.55 | 1.16 | 400 | 2.2 | 0.66 | Ex. 8 |
| A21-C3 | 2.98 | 0.39 | 0.47 | 1.40 | 535 | 2.1 | 0.65 | Ex. 9 |
| A11-C3 | 2.78 | 0.35 | 0.51 | 1.42 | 510 | 2.0 | 0.64 | Ex. 10 |
| A12-C3 | 2.66 | 0.31 | 0.53 | 1.41 | 505 | 2.0 | 0.65 | Ex. 11 |
| A10-K1 | 2.50 | 0.44 | 0.46 | 1.15 | 810 | 2.3 | 0.68 | Ex. 12 |
| A20-K1 | 2.40 | 0.24 | 0.64 | 1.54 | 480 | 2.2 | 0.66 | Ex. 13 |
| A50-K1 | 1.30 | 0.17 | 0.49 | 0.64 | 355 | 4.1 | 0.45 | C. Ex. 8 |
| A10-K3 | 3.20 | 0.41 | 0.56 | 1.79 | 990 | 2.0 | 0.67 | Ex. 14 |
| A20-K3 | 2.60 | 0.33 | 0.51 | 1.33 | 635 | 1.9 | 0.65 | Ex. 15 |
| A50-K3 | 2.10 | 0.27 | 0.42 | 0.88 | 525 | 3.7 | 0.66 | Ex. 16 |
| A21-K1 | 2.55 | 0.39 | 0.43 | 1.10 | 485 | 2.2 | 0.66 | Ex. 17 |
| A11-K1 | 2.88 | 0.35 | 0.49 | 1.41 | 445 | 2.1 | 0.65 | Ex. 18 |
| A12-K1 | 2.59 | 0.31 | 0.55 | 1.42 | 490 | 2.2 | 0.64 | Ex. 19 |
| A21-K3 | 3.57 | 0.37 | 0.50 | 1.79 | 605 | 2.0 | 0.64 | Ex. 20 |
| A11-K3 | 3.22 | 0.33 | 0.48 | 1.55 | 620 | 1.9 | 0.66 | Ex. 21 |
| A12-K3 | 3.04 | 0.35 | 0.48 | 1.46 | 670 | 1.8 | 0.65 | Ex. 22 |

(Note)
*[1]Not measureable

TABLE 2

| Support carbon material | $V_A$ (mL/g) | $V_{2-5}/V_A$ | $V_{5-25}/V_A$ | $V_{5-25}$ (mL/g) | $S_{2-50}$ (m2/g) | Aver. par. radius (μm) | Output voltage (V) | |
|---|---|---|---|---|---|---|---|---|
| AA11 | 0.79 | 0.44 | 0.44 | 0.35 | 305 | 2.0 | 0.42 | C. Ex. 9 |
| AB11 | 0.75 | 0.28 | 0.59 | 0.44 | 270 | 2.1 | 0.43 | C. Ex. 10 |
| AA11-C3 | 2.85 | 0.42 | 0.46 | 1.31 | 605 | 2.2 | 0.66 | Ex. 23 |
| AB11-C3 | 2.67 | 0.37 | 0.46 | 1.23 | 585 | 2.3 | 0.66 | Ex. 24 |
| A10S-C3 | 3.65 | 0.35 | 0.51 | 1.86 | 1420 | 0.63 | 0.71 | Ex. 25 |
| A10SS-C3 | 4.13 | 0.34 | 0.47 | 1.94 | 1440 | 0.43 | 0.63 | Ex. 26 |
| A10L-C3 | 3.55 | 0.32 | 0.52 | 1.85 | 965 | 4.2 | 0.68 | Ex. 27 |
| A10LL-C3 | 3.44 | 0.34 | 0.53 | 1.82 | 920 | 5.3 | 0.62 | Ex. 28 |
| B | 1.53 | 0.51 | 0.27 | 0.41 | 912 | 2.3 | 0.43 | C. Ex. 11 |
| B-C1 | 1.98 | 0.42 | 0.44 | 0.87 | 877 | 2.2 | 0.66 | Ex. 29 |
| B-C3 | 3.22 | 0.37 | 0.51 | 1.64 | 765 | 2.0 | 0.65 | Ex. 30 |
| B-K1 | 1.78 | 0.40 | 0.45 | 0.80 | 856 | 2.2 | 0.66 | Ex. 31 |
| B-K3 | 4.02 | 0.39 | 0.43 | 1.73 | 789 | 2.0 | 0.65 | Ex. 32 |
| C | 1.67 | 0.80 | 0.06 | 0.10 | 896 | 2.3 | 0.39 | C. Ex. 12 |
| C-C1 | 2.05 | 0.63 | 0.24 | 0.49 | 823 | 2.2 | 0.42 | C. Ex. 13 |
| C-C3 | 2.78 | 0.48 | 0.41 | 1.14 | 767 | 2.1 | 0.65 | Ex. 33 |
| C-K1 | 2.14 | 0.61 | 0.26 | 0.56 | 817 | 2.2 | 0.41 | C. Ex. 14 |
| C-K3 | 3.15 | 0.45 | 0.43 | 1.35 | 743 | 2.0 | 0.65 | Ex. 34 |
| D | 0.01 | 0.01 | 0.01 | 0.00 | 12 | 0.6 | —*[1] | C. Ex. 15 |
| D-C1 | 0.78 | 0.12 | 0.17 | 0.13 | 145 | 0.6 | 0.41 | C. Ex. 16 |
| D-C3 | 1.18 | 0.23 | 0.41 | 0.48 | 313 | 0.6 | 0.64 | Ex. 35 |
| E (EC300) | 0.65 | 0.18 | 0.33 | 0.21 | 140 | 0.2 | 0.50 | C. Ex. 17 |
| F (YP80F) | 0.12 | 0.44 | 0.41 | 0.05 | 48 | 1.9 | 0.32 | C. Ex. 18 |
| G (AB) | 0.09 | 0.10 | 0.37 | 0.03 | 14 | 0.2 | 0.31 | C. Ex. 19 |
| H (MCND) | 0.88 | 0.53 | 0.23 | 0.20 | 435 | 0.3 | 0.51 | C. Ex. 20 |

(Note)
*[1]Not measureable

5. Results of Evaluation of Fuel Cell (1) Support Carbon Material Prepared by Method A A10 was too small in pore volume $V_A$ and, since using radius 5 nm particles for the template, had a relative large pore volume $V_{2-5}$. Conversely, the pore volume $V_{5-25}$ became small, the gas diffusion pores inside the particles became small, and the desired output voltage (0.60V or more) could not be obtained at the time of large current power generation under high humidity conditions. Further, A20 and A50 were too small in pore volume $V_A$ and, since using template particles of 5 nm or more in size, had a small pore volume $V_{2-5}$. The dispersion of the Pt particulates was poor and the diffusion of the reaction gas of oxygen inside the particles was poor, so the desired output voltage could not be achieved.

Effect of Activation Treatment C

A10-C1 and A20-C1 treated by $CO_2$ for 1 hour as activation treatment increased in pore volume $V_A$ due to activation. The balance of the pore volume $V_{2-5}$ and the pore volume $V_{5-25}$ became better. Further, the pore area $S_{2-50}$ also was sufficiently large. Both exhibited good output voltages at the time of large current power generation under high humidity conditions. On the other hand, A50-C1 was increased in pore volume $V_A$, but the increase in pore volume $V_{2-5}$ was small and the desired output voltage could not be achieved. Further, A10-C3, A20-C3, and A50-C3 treated by $CO_2$ for 3 hours as activation treatment all increased in pore volume $V_A$ and became better in balance of pore volume $V_{2-5}$ and pore volume $V_{5-25}$ due to the activation treatment. Further, the pore area $S_{2-50}$ was also sufficiently large. All exhibited good output voltages at the time of large current power generation under high humidity conditions. However, A50-C3 had a somewhat small absolute value of pore volume $V_{5-25}$ and was slightly inferior to the others in output voltage as a result.

A21, A11, and A12 all had a pore area $S_{2-50}$ of less than 300 m$^2$/g and were low in output voltage at the time of large current power generation under high humidity conditions. Among them as well, A11 and A12 had good balances of pore volume $V_{2-5}$ and pore volume $V_{5-25}$. If treating them to increase the pore area $S_{2-50}$ by activation treatment, it is expected that good power generation characteristics can be exhibited. Further, A21-C1, A11-C1, A12-C1, A21-C3, A11-C3, and A12-C3 obtained by treating the above three types of support carbon materials as activation treatment by $CO_2$ for 1 hour or 3 hours all exhibited excellent power generation characteristics at the time of large current power generation under high humidity conditions.

Further, AA11 and AB11 both were good in balance of pore volume $V_{2-5}$ and pore volume $V_{5-25}$, but were small in the total volume of the pore volume $V_A$ and were low in the output voltage at the time of large current power generation under high humidity conditions. AA11-C3 and AB11-C3 obtained by treating AA11 and AB11 by $CO_2$ activation treatment were both excellent in output characteristics at the time of large current power generation under high humidity conditions.

Effect of Activation Treatment K

In the support carbon materials obtained by treating A10, A20, A50, A21, A11, and A12 by activation treatment by KOH for 1 hour or 3 hours, in the case of A50 where the particle size of the particles of the casting mold was 50 nm, with treatment for 1 hour, it was not possible to create a pore volume $V_{2-5}$ with a small pore size, but with treatment for 3 hours, the balance between the pore volume $V_{2-5}$ and pore volume $V_{5-25}$ was good, the desired pore structure with the large pore area $S_{2-50}$ could be obtained, and, further, in the case of the support carbon materials where the particle size of the casting mold was 10 nm or 20 nm, the desired pore structures were obtained and the materials all exhibited excellent power generation characteristics at the time of large current power generation under high humidity conditions.

Effect of Average Particle Radius

A10S-C3, A10SS-C3, A10L-C3, and A10LL-C3 were all excellent in pore structure (pore volume $V_A$, ratio $V_{2-5}/V_A$, ratio $V_{5-25}/V_A$, pore volume $V_{5-25}$, and pore area $S_{2-50}$). In particular, A10S-C3 and A10L-C3 had average particle radii of respectively 0.63 μm and 4.2 μm and exhibited excellent power generation characteristics at the time of large current power generation under high humidity conditions.

(2) Support Carbon Material Prepared by Method B

The support carbon material B prepared by the method B was excellent in pore volume $V_A$, but the ratio of pore volume $V_{2-5}$ was high and the ratio of pore volume $V_{5-25}$ became relatively lower. The output voltage at the time of large current power generation under high humidity conditions was low. On the other hand, the support carbon materials obtained using the support carbon material B as a starting material and treating them by the activation treatment C or activation treatment K all were excellent in pore structure (pore volume $V_A$, ratio $V_{2-5}/V_A$, ratio $V_{5-25}/V_A$, pore volume $V_{5-25}$, and pore area $S_{2-50}$) and exhibited excellent power generation characteristics at the time of large current power generation under high humidity conditions.

(3) Support Carbon Material Prepared by Method C

The support carbon material C prepared by the method C was excellent in pore volume $V_A$, but the ratio of pore volume $V_{2-5}$ was high and relatively the ratio of pore volume $V_{5-25}$ became lower. The output voltage at the time of large current power generation under high humidity conditions was low. On the other hand, the support carbon materials obtained using the support carbon material C as a starting material and treating them by the activation treatment C or activation treatment K all were excellent in pore structure (pore volume $V_A$, ratio $V_{2-5}/V_A$, ratio $V_{5-25}/V_A$, pore volume $V_{5-25}$, and pore area $S_{2-50}$) and exhibited excellent power generation characteristics at the time of large current power generation under high humidity conditions.

(4) Support Carbon Material Prepared by Method D

The support carbon material D prepared by the method D had almost all pores of a radius of 1 nm or less. Radius 2 nm or more pores substantially did not exist. This was inferior in power generation characteristics at the time of large current power generation under high humidity conditions when used as a catalyst support. On the other hand, the support carbon material D-C1 obtained by treating the support carbon material D by the activation treatment C for 1 hour was insufficient in formation of 2 nm or more pores and low in output voltage at the time of large current power generation under high humidity conditions, but the support carbon material D-C3 obtained by treating it by the activation treatment C for 3 hours exhibited excellent power generation characteristics at the time of large current power generation under high humidity conditions.

(4) Other Carbon Materials

The support carbon material E used as an example of carbon black, the support carbon material F used as an example of activated carbon, the support carbon material G used as an example of a carbon material not treated to make it porous, and the support carbon material H used as an example of MCND all were inferior in pore structures (pore volume $V_A$, ratio $V_{2-5}/V_A$, ratio $V_{5-25}/V_A$, pore volume $V_{5-25}$, and pore area $S_{2-50}$) and did not achieve the desired output voltage at the time of large current power generation under high humidity conditions.

REFERENCE SIGNS LIST

1 . . . support carbon material particles
2 . . . radius 2 nm to 5 nm pores (catalyst support pores)
3 . . . radius 5 nm to 25 nm pores (gas diffusion pores)

The invention claimed is:

1. A support carbon material for solid polymer type fuel cell use comprised of a porous carbon material which has a pore volume and a pore area found by the BJH analysis method from a nitrogen adsorption isotherm in an adsorption process satisfying the following conditions:

a radius 2 nm to 50 nm pore volume $V_A$ of 1 ml/g to 5 ml/g and a radius 2 nm to 50 nm pore area $S_{2-50}$ of 300 m$^2$/g to 1500 m$^2$/g and a ratio ($V_{5-25}/V_A$) of radius 5 nm to 25 nm pore volume $V_{5-25}$ (ml/g) to said pore volume $V_A$ (ml/g) of 0.4 to 0.7 and a ratio ($V_{2-5}/V_A$) of radius 2 nm to 5 nm pore volume $V_{2-5}$ (ml/g) to the same of 0.2 to 0.5.

2. The support carbon material for solid polymer type fuel cell use according to claim 1 wherein said pore volume $V_{5-25}$ is 0.7 ml/g to 2 ml/g.

3. The support carbon material for solid polymer type fuel cell use according to claim 1 or 2 wherein an average particle radius is 0.1 μm to 5 μm.

4. A catalyst for solid polymer type fuel cell use comprising
 a support carbon material for solid polymer type fuel cell use according to any one of claim 1 at which catalyst metal particulates comprised of Pt or a Pt alloy having Pt as its main component are supported.

5. A catalyst for solid polymer type fuel cell use comprising
 a support carbon material for solid polymer type fuel cell use according to claim 2 at which catalyst metal particulates comprised of Pt or a Pt alloy having Pt as its main component are supported.

6. A catalyst for solid polymer type fuel cell use comprising
 a support carbon material for solid polymer type fuel cell use according to claim 3 at which catalyst metal particulates comprised of Pt or a Pt alloy having Pt as its main component are supported.

\* \* \* \* \*